US00RE40758E

(19) United States
(12) Reissued Patent
Krull et al.

(10) Patent Number: US RE40,758 E
(45) Date of Reissued Patent: Jun. 23, 2009

(54) FUEL OILS HAVING IMPROVED LUBRICITY COMPRISING MIXTURES OF FATTY ACIDS WITH PARAFFIN DISPERSANTS, AND A LUBRICATION-IMPROVING ADDITIVE

(75) Inventors: Matthias Krull, Oberhausen (DE); Werner Reimann, Frankfurt am Main (DE)

(73) Assignee: Clariant Produkte (Deutschland) GmbH, Frankfurt (DE)

(21) Appl. No.: 10/938,495

(22) Filed: Sep. 10, 2004

Related U.S. Patent Documents

Reissue of:
(64) Patent No.: 6,610,111
Issued: Aug. 26, 2003
Appl. No.: 09/993,590
Filed: Nov. 16, 2001

(30) Foreign Application Priority Data

Nov. 24, 2000 (DE) ..... 100 58 359

(51) Int. Cl.
*C10L 1/18* (2006.01)
*C10L 1/22* (2006.01)

(52) U.S. Cl. ..... 44/385; 44/403; 44/404; 44/412

(58) Field of Classification Search ..... 44/385, 44/403, 404, 412
See application file for complete search history.

(56) References Cited

U.S. PATENT DOCUMENTS

| | | | | | |
|---|---|---|---|---|---|
| 2,487,189 | A | | 11/1949 | Smith et al. | 44/71 |
| 4,985,048 | A | * | 1/1991 | Wirtz et al. | 44/394 |
| 5,186,720 | A | * | 2/1993 | Feustel et al. | 44/351 |
| 5,376,155 | A | * | 12/1994 | Dralle-Voss et al. | 44/408 |
| 5,391,632 | A | * | 2/1995 | Krull et al. | 525/327.6 |
| 5,789,510 | A | * | 8/1998 | Krull et al. | 526/281 |
| 5,833,722 | A | * | 11/1998 | Davies et al. | 44/418 |
| 6,010,545 | A | * | 1/2000 | Davies et al. | 44/389 |
| 6,071,993 | A | * | 6/2000 | Wenderoth et al. | 524/217 |
| 6,086,645 | A | * | 7/2000 | Quigley et al. | 44/418 |
| 6,129,772 | A | * | 10/2000 | Weers et al. | 44/385 |

FOREIGN PATENT DOCUMENTS

| | | | |
|---|---|---|---|
| EP | 0153176 | * | 8/1985 |
| EP | 0 155 171 | | 9/1985 |
| EP | 0272889 A2 | | 6/1988 |
| EP | 0320766 | * | 6/1989 |
| EP | 0413279 | * | 2/1991 |
| EP | 0597278 | * | 5/1994 |
| EP | 0597278 A1 | | 5/1994 |
| EP | 0606055 | * | 7/1994 |
| EP | 0829527 A1 | | 9/1996 |
| EP | 0780460 A1 | | 12/1996 |
| EP | 0 798 364 | * | 10/1997 |
| EP | 0 829 527 | | 3/1998 |
| EP | 0909307 | * | 4/1999 |
| EP | 0138461 A1 | | 5/2001 |
| WO | WO9533805 | * | 12/1995 |
| WO | WO9618706 | * | 6/1996 |
| WO | WO9623855 | * | 8/1996 |
| WO | 00/15739 | | 3/2000 |
| WO | WO0138461 | * | 5/2001 |

OTHER PUBLICATIONS

EPO Office Action and Search Report for Corresponding Appl. No. 07005871.4, dated Aug. 30, 2007.
EPO Office Action and Search Report for Corresponding Appl. No. 07005870.6, dated Aug. 30, 2007.
U.S. Appl. No. 09/993,847, filed Nov. 16, 2001.*
German office action for application 10058359, Jan. 11, 2001.*
English abstract for JP 11–001692, Jan. 6, 1999.*
J. March, Advanced Organic Chemistry, 2, Auflage, S. 347–360 (1977).*
N.A. Plate, et al., "Comb–Like Polymers—Structure and Properties", *J. Polymer Science*: Macromolecular Reviews, vol. 8, 117–253 (1974).*
H.A. Spikes; "The Lubricity of Diesel Fuels", Wear, 111 (1986) p. 217–235.*

* cited by examiner

*Primary Examiner*—Cephia D. Toomer
(74) *Attorney, Agent, or Firm*—Richard P. Silverman

(57) ABSTRACT

The invention relates to low-temperature-stabilized additives for fuel oils having a sulfur content of up 0.05% by weight, comprising fatty acid mixtures of A1) from 1 to 99% by weight of at least one saturated mono- or dicarboxylic acid having from 6 to 50 carbon atoms, A2) from 1 to 99% by weight of at least one unsaturated mono- or dicarboxylic acid having from 6 to 50 carbon atoms, and B) at least one polar nitrogen-containing compound which is effective as paraffin dispersant in middle distillates, in an amount of from 0.01 to 90% by weight, based on the total weight of A1), A2) and B);

and to the use of said mixtures for improving the lubrication properties of low-sulfur middle distillates.

5 Claims, No Drawings

FUEL OILS HAVING IMPROVED LUBRICITY COMPRISING MIXTURES OF FATTY ACIDS WITH PARAFFIN DISPERSANTS, AND A LUBRICATION-IMPROVING ADDITIVE

Matter enclosed in heavy brackets [ ] appears in the original patent but forms no part of this reissue specification; matter printed in italics indicates the additions made by reissue.

BACKGROUND OF THE INVENTION

The present invention relates to mixtures of fatty acids and paraffin dispersants of improved low-temperature stability, and to their use for improving the lubricity of middle-distillate fuel oils.

FIELD OF THE INVENTION

Mineral oils and mineral-oil distillates which are used as fuel oils generally comprise 0.5% by weight or more of sulfur, which causes the formation of sulfur dioxide on combustion. In order to reduce the resultant environmental pollution, the sulfur content of fuel oils is constantly being reduced further. The EN 590 standard, which relates to diesel fuels, currently prescribes a maximum sulfur content of 350 ppm in Germany. In Scandinavia, fuel oils containing less than 50 ppm and in exceptional cases less than 10 ppm of sulfur are already in use. These fuel oils are generally produced by subjecting the fractions obtained from crude oil by distillation to reductive refining. During desulfurization, however, other substances are also removed which give the fuel oils a natural lubricity. These substances include, inter alia, polyaromatic and polar compounds.

However, it has now been found that the friction- and wear-reducing properties of fuel oils become worse with increasing degree of desulfurization. These properties are frequently so unsatisfactory that corrosion phenomena must be expected after only a short time on the materials lubricated by the fuel, such as, for example, distributor injection pumps of diesel engines. The maximum value for a 95% distillation point of a maximum of 360° C. which has been prescribed in EN 590 since the year 2000 and the further reduction in the 95% distillation point to below 360° C. and in some cases below 330° C. which has in the meantime been effected in Scandinavia intensify these problems further.

DESCRIPTION OF THE RELATED ART

The prior art has therefore described approaches which are intended to represent a solution to this problem (so-called lubricity additives).

EP-A-0 798 364 discloses salts and amines of mono- to tetracarboxylic acids having from 2 to 50 carbon atoms and aliphatic mono/polyamines having from 2 to 50 carbon atoms and from 1 to 10 nitrogen atoms as lubricity additives for low-sulfur diesel fuel. Preferred amines have 8–20 carbon atoms, such as, for example, coconut fatty amine, tallow fatty amine and oleylamine.

WO-A-95/33805 discloses the use of cold-flow improvers for improving the lubricity of low-sulfur middle distillates. The suitable substances mentioned include polar nitrogen-containing compounds which contain an $NR^{13}$ group, where $R^{13}$ is a hydrocarbon radical having from 8 to 40 carbon atoms, and may be in the form of a cation.

WO-A-96/18706 discloses, analogously to WO-A-95/33805, the use of the nitrogen-containing compounds mentioned therein in combination with lubricity additives.

WO-A-96123855 discloses, analogously to WO-A-95/33805, the use of the nitrogen-containing compounds mentioned therein in combination with detergent additives.

The fatty acids used in accordance with the prior art have the disadvantage that they solidify on storage at low temperatures, i.e. often at room temperature, usually at temperatures of from 0° C. to at the latest −5° C., or deposit crystalline fractions and cause problems in handling. This problem can only be partially solved even by dilution with organic solvents, since fractions also crystallize from these solutions or the solution gels and solidifies. For use as lubricity additives, they therefore have to be diluted to a great extent or stored in heated storage containers and dispensed via heated lines.

The effectiveness of cold-flow improvers as lubricity additives is alone not sufficient, which means that either very high dispensing rates or synergists have to be employed.

SUMMARY OF THE INVENTION

The object on which the present invention is based was to find lubricity additives which improve the lubricity of middle distillates at reduced dispensing rates, but remain homogeneous, clear and in particular flowable even at low temperatures.

It has been found that mixtures of fatty acids with polar nitrogen-containing compounds which are effective as paraffin dispersants in middle distillates remain flowable and clear for an extended time even at significantly reduced temperatures, in some cases down to below −20° C., in particular cases down to below −30° C. and in special cases down to below −40° C., and in addition improve the lubricity of middle distillates more efficiently than pure fatty acids of the prior art.

The invention thus relates to low-temperature-stabilized additives for fuel oils having a sulfur content of up to 0.05% by weight, comprising fatty acid mixtures of A1) from 1 to 99% by weight of at least one saturated mono- or dicarboxylic acid having from 6 to 50 carbon atoms, A2) from 1 to 99% by weight of at least one unsaturated mono- or dicarboxylic acid having from 6 to 50 carbon atoms, and at least one polar nitrogen-containing compound which is effective as paraffin dispersant in middle distillates in an amount of from 0.01 to 90% by weight, based on the total weight of A1), A2) and B).

DETAILED DESCRIPTION OF THE INVENTION

The invention furthermore relates to low-temperature-stabilized solutions of the additives according to the invention in organic solvents, where the solutions comprise from 1 to 90% by weight of solvent. Suitable solvents are aliphatic and/or aromatic hydrocarbons or hydrocarbon mixtures. The additives according to the invention preferably comprise 1–80%, especially 10–70%, in particular 25–60%, of solvent. The low-temperature-stabilized solutions according to the invention have a pour point of below −40° C., preferably −45° C., in particular −50° C.

The invention furthermore relates to low-temperature-stabilized fatty acid mixtures of A1) from 1 to 99% by weight of at least one saturated mono- or dicarboxylic acid having from 6 to 50 carbon atoms, A2) from 1 to 99% by weight of at least one unsaturated mono- or dicarboxylic acid having from 6 to 50 carbon atoms, and at least one polar nitrogen-containing compound which is effective as paraffin dispersant in middle distillates, in an amount of from 0.01 to 90% by weight, based on the total weight of A1), A2) and B).

The invention furthermore relates to fuel oils comprising, besides a middle distillate having a sulfur content of up to 0.05% by weight, fatty acid mixtures of A1) from 1 to 99% by weight of at least one saturated mono- or dicarboxylic acid having from 6 to 50 carbon atoms, A2) from 1 to 99% by weight of at least one unsaturated mono- or dicarboxylic acid having from 6 to 50 carbon atoms, and at least one polar nitrogen-containing compound which is effective as paraffin dispersant in middle distillates, in an amount of from 0.01 to 90% by weight, based on the total weight of A1), A2) and B).

The invention furthermore relates to the use of said mixtures comprising constituents A and B for improving he lubrication properties of low-sulfur middle distillates having a sulfur content of up to 0.05% by weight.

Preferred fatty acids (constituent A) are those having 8–40 carbon atoms, in particular 12–22 carbon atoms. The alkyl radicals in the fatty acids essentially consist of carbon and hydrogen. However, they may carry further substituents, such as, for example, hydroxyl, hydrogen, amino or nitro groups, so long as these do not impair the predominant hydrocarbon character.

Constituent A2) may contain one or more double bonds and be of natural or synthetic origin. In the case of polyunsaturated carboxylic acids, their double bonds may be isolated or conjugated. The proportion of saturated fatty acids A1) in the mixture of A1) and A2) is preferably less than 20% by weight, in particular less than 10% by weight, especially less than 5% by weight. In preferred fatty acid mixtures, which is taken to mean the combination of A1) and A2) here, at least 50% by weight, in particular at least 75% by weight, especially at least 90% by weight, of the constituents contain one or more double bonds. These preferred fatty acid (mixtures) have iodine numbers of at least 40 g of 1/100 g, preferably at least 80 g of 1/100 g, in particular at least 125 g of 1/100 g.

Examples of suitable fatty acids are lauric, tridecanoic, myristic, pentadecanoic, palmitic, margaric, stearic, isostearic, arachic arid behenic acid, oleic and erucic acid, palmitoleic, myristoleic, linoleic, linolenic, elaeosteric and arachidonic acid, ricinoleic acid and fatty acid mixtures obtained from natural fats and oils, such as, for example, coconut oil, groundnut oil, fish, linseed oil, palm oil, rape oil, ricinene oil, castor oil, colza oil, soybean oil, sunflower oil and tall oil fatty acid.

Likewise suitable are dicarboxylic acids, such as dimeric fatty acids and alkyl- and alkenylsuccinic acids containing $C_8$–$C_{30}$-alk(en)yl radicals, preferably containing $C_8$–$C_{40}$-, in particular containing $C_{12}$–$C_{22}$-alkyl radicals. The alkyl radicals may be linear or branched (oligomerized alkene, PIB).

The fatty acids may furthermore comprise 1–40% by weight, especially 1–25% by weight, of resin acids, based on the weight of A1) and A2) together.

The additives according to the invention comprise, as constituent B, at least one polar nitrogen-containing compound which is effective as paraffin dispersant in middle distillates. Paraffin dispersants reduce the size of the paraffin crystals which precipitate out at low temperatures and have the effect that the paraffin particles do not settle out, but instead remain dispersed in colloidal form with significantly reduced sedimentation volition. Paraffin dispersants which have proven successful are oil soluble polar compounds containing ionic or polar groups, for example amine salts and/or amides, which are obtained by reaction of aliphatic or aromatic amines, preferably long-chain aliphatic amines, with aliphatic or aromatic mono-, di-, tri- or tetracarboxylic acids or anhydrides thereof. Particularly preferred paraffin dispersants comprise products of the reaction of secondary fatty amines having from 8 to 36 carbon atoms, in particular dicoconut fatty amine, ditallow fatty amine and distearyl fatty amine. Other paraffin dispersants are copolymers of maleic anhydride and α,β-unsaturated compounds, which can, if desired, be reacted with primary monoalkylamines and/or aliphatic alcohols, the products of the reaction of alkenylspirobislactones with amines, and products of the reaction of terpolymers based on α,β-unsaturated dicarboxylic anhydrides, α,β-unsaturated compounds and polyoxyalkylene ethers of lower unsaturated alcohols. Alkylphenol-formaldehyde resins are also suitable as paraffin dispersants. Some suitable paraffin dispersants are listed below.

Some of the paraffin dispersants mentioned below are prepared by reaction of compounds containing an acyl group with an amine. This amine is a compound of the formula $NR^6R^7R^8$, in which $R^6$, $R^7$ and $R^8$ may be identical or different, and at least one of these groups is $C_8$–$C_{36}$-alkyl, $C_6$–$C_{36}$-cycloalkyl, $C_8$–$C_{36}$-alkenyl, in particular $C_{12}$–$C_{24}$-alkyl, $C_{12}$–$C_{24}$-alkenyl or cyclohexyl, and the other groups are either hydrogen, $C_1$–$C_{36}$-alkyl, $C_2$–$C_{36}$-alkenyl, cyclohexyl, or a group of the formula $—(A—O)_x—E$ or $—(CH_2)_n—NYZ$, in which A is an ethylene or propylene group, x is a number from 1 to 50, E═H, $C_1$–$C_{30}$-alkyl, $C_5$–$C_{12}$-cycloalkyl or $C_6$–$C_{30}$-aryl, and n is 2, 3 or 4, and Y and Z, independently of one another, are H, $C_1$–$C_{30}$-alkyl or $—(A—O)_x$. The term acyl group here is taken to mean a functional group of the following formula:

C═O

Products of the reaction of alkenylspirobislactones of the formula 4

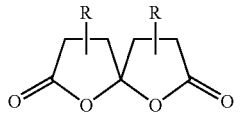

(4)

in which each R is $C_8$–$C_{200}$-alkenyl, with amines of the formula $NR^6R^7R^8$. Suitable reaction products are mentioned in EP-A-0 413 279. Depending on the reaction conditions, the reaction of compounds of the formula (4) with the amines gives amides or amide ammonium salts.

Amides or ammonium salts of aminoalkylenepolycarboxylic acids with secondary amines of the formulae 5 and 6

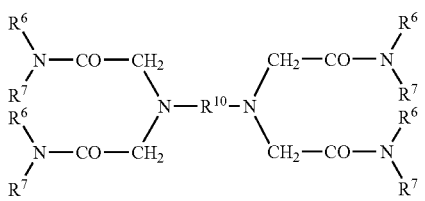

(5)

-continued (6)

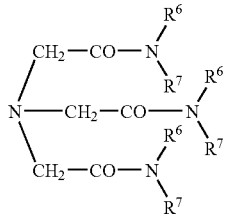

in which $R^{10}$ is a straight-chain or branched alkylene radical having from 2 to 6 carbons or the radical of the formula 7

(7)

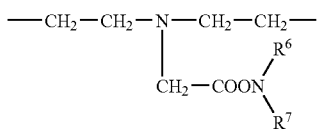

in which $R^6$ and $R^7$ are, in particular, alkyl radicals having from 10 to 30, preferably from 14 to 24 carbon atoms, where all or some of the amide structures may also be in the form of the ammonium salt structure of the formula 8

(8)

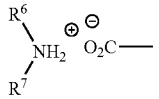

The amides or amide ammonium salts or ammonium salts, for example of nitrilotriacetic acid, of ethylenediaminetetraacetic acid or of propylene-1,2-diaminetetraacetic acid, are obtained by reaction of the acids with from 0.5 to 1.5 mol of amine, preferably from 0.8 to 1.2 mol of amine, per carboxyl group. The reaction temperatures are from about 80 to 200° C., with continuous removal of the water of reaction formed in order to prepare the amides. However, the reaction does not have to be continued completely to the amide, but instead from 0 to 100 mol % of the amine formed may be in the form of the ammonium salt. Under analogous conditions, the compounds mentioned under B1) can also be prepared.

Suitable amines of the formula 9

(9)

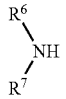

are, in particular, dialkylamines in which $R^6$ and $R^7$ are a straight-chain alkyl radical having from 10 to 30 carbon atoms, preferably from 14 to 24 carbon atoms. Specific mention may be made of dioleylamine, dipalmitylamine, dicoconut fatty amine and dibehenylamine and preferably ditallow fatty amine.

Quaternary ammonium salts of the formula 10

$$^{+}NR^6R^7R^8R^{11}\,X^- \quad (10)$$

in which $R^6$, $R^7$ and $R^8$ are as defined above, and $R^{11}$ is $C_1$–$C_{30}$-alkyl, preferably $C_1$–$C_{22}$-alkyl, $C_1$–$C_{30}$-alkenyl, preferably $C_1$–$C_{22}$-alkenyl, benzyl or a radical of the formula —($CH_2$—$CH_2$—O)$_n$—R, where $R^{12}$ is hydrogen or a fatty acid radical of the formula C(O)—$R^{13}$, where $R^{13}$+ $C_6$–$C_{40}$-alkenyl, n is a number from 1 to 30, and X is halogen, preferably chlorine, or a methosulfate.

Examples which may be mentioned of quaternary ammonium salts of this type are the following: dihexadecyldimethylammonium chloride, distearyldimethylammonium chloride, products of the quaternization of esters of di- and triethanolamine with long-chain fatty acids, (lauric acid, myristic acid, palmitic acid, stearic acid, behenic acid, oleic acid and fatty acid mixtures, such as coconut fatty acid, tallow fatty acid, hydrogenated tallow fatty acid and tall oil fatty acid), such as N-methyltriethanolammonium distearyl ester chloride, N-methyltriethanolammonium distearyl ester methosulfate, N,N-dimethyldiethanolammonium distearyl ester chloride, N-methyltriethanolammonium dioleyl ester chloride, N-methyltriethanol-ammonium trilauryl estermethosulfate, N-methyltriethanolammonium tristearyl ester methosulfate and mixtures thereof.

Compounds of the formula 11

(11)

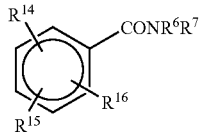

in which $R^{14}$ is $CONR^6R^7$ or $CO_2^-\ ^+H_2NR^6R^7$, $R^{15}$ and $R^{16}$ are H, $CONR^{17}{}_2$, $CO_2R^{17}$ or $OCOR^{17}$, —$OR^{17}$, —$R^{17}$ or —$NCOR^{17}$, and $R^{17}$ is alkyl, alkoxyalkyl or polyalkoxyalkyl and has at least 10 carbon atoms.

Preferred carboxylic acids or acid derivatives are phthalic acid (anhydride), trimellitic and pyromellitic acid (dianhydride), isophthalic acid, terephthalic acid, cyclohexanedicarboxylic acid (anhydride), maleic acid (anhydride) and alkenylsuccinic acid (anhydride). The formulation (anhydride) means that the anhydrides of said acids are also preferred acid derivatives.

If the compounds of the formula (II) are amides or amine salts, they are preferably obtained from a secondary amine which contains a hydrogen- and carbon-containing group having at least 10 carbon atoms.

$R^{17}$ preferably contains from 10 to 30, in particular from 10 to 22, for example from 14 to 20, carbon atoms, and is preferably straight-chain or branched in the 1- or 2-position. The other hydrogen- and carbon-containing groups may be shorter, for example contain fewer than 6 carbon atoms, or may, if desired, have at least 10 carbon atoms. Suitable alkyl groups include methyl, ethyl, propyl, hexyl, decyl, dodecyl, tetradecyl, eicosyl and docosyl (behenyl).

Also suitable are polymers containing at least one amide or ammonium group bonded directly to the polymer skeleton, where the amide or ammonium group carries at least one alkyl group having at least 8 carbon atoms on the nitrogen atom. Polymers of this type can be prepared in various ways. One method is to use a polymer which contains a plurality of carboxyl or carboxylic anhydride groups and to react this polymer with an amine of the formula $NHR^6R^7$ in order to obtain the desired polymer.

Suitable polymers for this purpose are generally copolymers of unsaturated esters, such as $C_1$–$C_{40}$-alkyl (meth) acrylates, di($C_1$–$C_{40}$-alkyl) fumarates, $C_1$–$C_{40}$-alkyl vinyl ethers, $C_1$–$C_{40}$-alkyl vinyl esters or $C_2$–$C_{40}$-olefins (linear, branched or aromatic) with unsaturated carboxylic acids or reactive derivatives thereof, such as, for example, carboxylic anhydrides (acrylic acid, methacrylic acid, maleic acid, fumaric acid, tetrahydrophthalic acid, citraconic acid, preferably maleic anhydride).

Carboxylic acids are preferably reacted with from 0.1 to 1.5 mol, in particular from 0.5 to 1.2 mol, of amine per acid group, while carboxylic anhydrides are preferably reacted with from 0.1 to 2.5 mol, in particular from 0.5 to 2.2 mol, of amine per acid anhydride group, with amides, ammonium salts, amide ammonium salts or imides being formed, depending on the reaction conditions. Thus, copolymers containing unsaturated carboxylic anhydrides give half amide and half amine salts on reaction with a secondary amine owing to the reaction with the anhydride group. Water can be eliminated by heating with formation of the diamide.

Particularly suitable examples of amide group-containing polymers for use in accordance with the invention are the following:

Copolymers (a) of a dialkyl fumarate, maleate, citraconate or itaconate with maleic anhydride, or (b) of vinyl esters, for example vinyl acetate or vinyl stearate, with maleic anhydride, or (c) of a dialkyl fumarate, maleate, citraconate or itaconate with maleic anhydride and vinyl acetate.

Particularly suitable examples of these polymers are copolymers of didodecyl fumarate, vinyl acetate and maleic anhydride; ditetradecyl fumarate, vinyl acetate and maleic anhydride; dihexadecyl fumarate, vinyl acetate and maleic anhydride; or the corresponding copolymers in which the itaconate is used instead of the fumarate.

In the above-mentioned examples of suitable polymers, the desired amide is obtained by reaction of the polymer containing anhydride groups with a secondary amine of the formula $HNR^6R^7$ (if desired in addition with an alcohol if an ester-amide is formed). If polymers containing an anhydride group are reacted, the resultant amino groups will be ammonium salts and amides. Polymers of this type can be used with the proviso that they contain at least two amide groups.

It is essential that the polymer containing at least two amide groups contains at least one alkyl group having at least 10 carbon atoms. This long-chain group, which may be a straight-chain or branched alkyl group, may be bonded via the nitrogen atom of the amide group.

The amines which are suitable for this purpose may be represented by the formula $R^6R^7NH$ and the polyamines by $R^6NH[R^{19}NH]_xR^7$, where $R^{19}$ is a divalent hydrocarbon group, preferably an alkylene or hydrocarbon-substituted alkylene group, and x is an integer, preferably between 1 and 30. One of the two or both radicals $R^6$ and $R^7$ preferably contains at least 10 carbon atoms, for example from 10 to 20 carbon atoms, for example dodecyl, tetradecyl, hexadecyl or octadecyl.

Examples of suitable secondary amines are dioctylamine and those which contain alkyl groups having a least 10 carbon atoms, for example didecylamine, didodecylamine, dicoconut amine (i.e. mixed $C_{12}$–$C_{14}$-amines), dioctadecylamine, hexadecyloctadecylamine, di(hydrogenated tallow) amine (approximately 4% by weight of n-$C_{14}$-alkyl, 30% by weight of n-$C_{10}$-alkyl, 60% by weight of n-$C_{18}$-alkyl, the remainder is unsaturated).

Examples of suitable polyamines are N-octadecylpropanediamine, N,N'-dioctadecylpropanediamine, N-tetradecylbutanediamine and N,N'-dihexadecylhexanediamine, N-(coconut) propylenediamine ($C_{12}$/$C_{14}$-alkylpropylene-diamine), N-(tallow) propylenediamine ($C_{12}$/$C_{18}$-alkylpropylenediamine).

The amide-containing polymers usually have a mean molecular weight (number average) of from 1000 to 500,000, for example from 10,000 to 100,000.

Copolymers of styrene, derivatives thereof or aliphatic olefins having from 2 to 40 carbon atoms, preferably having from 6 to 20 carbon atoms, and olefinically unsaturated carboxylic acids or carboxylic anhydrides which have been reacted with amines of the formula $HNR^6R^7$. The reaction can be carried out before or after the polymerization.

In detail, the structural units of the copolymers are derived from, for example, maleic acid, fumaric acid, tetrahydrophthalic acid, citraconic acid, preferably maleic anhydride. They can be employed either in the form of their homopolymers or in the form of the copolymers. Suitable comonomers are the following: styrene and alkylstyrenes, straight-chain and branched olefins having from 2 to 40 carbon atoms, and mixtures thereof with one another. Examples which may be mentioned are the following: styrene, α-methyl-styrene, dimethylstyrene, α-ethylstyrene, diethylstyrene, i-propylstyrene, tert-butylstyrene, ethylene, propylene, n-butylene, diisobutylene, decene, dodecene, tetradecene, hexadecene and octadecene. Preference is given to styrene and isobutene, particular preference is given to styrene.

Examples of polymers which may be mentioned individually are the following: polymaleic acid, a molar styrene-maleic acid copolymer with an alternating structure, styrene-maleic acid copolymers with a random structure in the ratio 10:90 and an alternating copolymer of maleic acid and i-butene. The molecular weights of the polymers are generally from 500 g/mol to 20,000 g/mol, preferably from 700 to 2000 g/mol.

The reaction of the polymers or copolymers with the amines is carried out at temperatures of from 50 to 200° C. over the course of from 0.3 o 30 hours. The amine here is used in amounts of approximately one mole per mole of copolymerized dicarboxylic anhydride, i.e. from about 0.9 to 1.1 mol/mol. The use of larger or smaller amounts is possible, but does not bring any advantage. If larger amounts than one mole are used, ammonium salts are partly obtained, since the formation of a second amide group requires higher temperatures, longer residence times and separation of water. If smaller amounts than one mole are used, complete conversion to the monoamide does not take place, and a correspondingly reduced action is obtained.

Instead of the subsequent reaction of the carboxyl groups in the form of the dicarboxylic anhydride with amines to give the corresponding amides, it is sometimes of advantage to prepare the monoamides of the monomers and then to copolymerize them directly in the polymerization. Usually, however, this is much more technically complex, since the amines are able to add onto the double bond of the monomeric mono- and dicarboxylic acid, and copolymerization is then no longer possible.

Copolymers consisting of from 10 to 95 mol % of one or more alkyl acrylates or alkyl-methacrylates having $C_1$–$C_{26}$-alkyl chains and from 5 to 90 mol % of one or more ethylenically unsaturated dicarboxylic acids or anhydrides thereof, where the copolymers have substantially been reacted with one or more primary or secondary amines to give the monoamides or amide/ammonium salts of the dicarboxylic acids.

The copolymers consist of from 10 to 95 mol %, preferably from 40 to 95 mol % and particularly preferably from 60 to 90 mol %, of alkyl (meth)acrylates and from 5 to 90 mol %, preferably from 5 to 60 mol % and particularly preferably from 10 to 40 mol % of the olefinically unsaturated dicarboxylic acid derivatives. The alkyl groups of the alkyl (meth)acrylates contain from 1 to 26, preferably from 4 to 22 and particularly preferably from 8 to 18 carbon atoms. They are preferably straight-chain and unbranched. However, it is also possible for up to 20% by weight of cyclic and/or branched components to be present.

Examples of particularly preferred alkyl (meth)acrylates are n-octyl (meth)acrylate, n-decyl (meth)acrylate, n-dodecyl (meth)acrylate, n-tetradecyl (meth)acrylate, n-hexadecyl (meth)acrylate and n-octadecyl (meth)acrylate, and mixtures thereof.

Examples of ethylenically unsaturated dicarboxylic acids are maleic acid, tetrahydrophthalic acid, citraconic acid and itaconic acid, and anhydrides thereof, and fumaric acid. Preference is given to maleic anhydride.

Suitable amines are compounds of the formula $HNR^6R^7$.

In general, it is advantageous to employ the dicarboxylic acids in the form of the anhydrides, if available, in the copolymerization, for example maleic anhydride, itaconic anhydride, citraconic anhydride and tetrahydrophthalic anhydride, since the anhydrides copolymerize better with the (meth)acrylates. The anhydride groups of the copolymers can then be reacted directly with the amines. The reaction of the polymers with the amines is carried out at temperatures of from 50 to 200° C. over the course of from 0.3 to 30 hours. The amine here is used in amounts of from approximately one to two moles per mole of copolymerized dicarboxylic anhydride, i.e. from about 0.9 to 2.1 mol/mol. The use of larger or smaller amounts is possible, but does not bring any advantage. If larger amounts than 2 mol are used, free amine is present. If smaller amounts than one mole are used, complete conversion to the monoamide does not take place, and a correspondingly reduced action is obtained.

In some cases, it may be advantageous for the amide/ammonium salt structure to be built up from two different amines. Thus, for example, a copolymer of lauryl acrylate and maleic anhydride can firstly be reacted with a secondary amine, such as hydrogenated ditallow fatty amine, to give the amide, after which the free carboxyl group originating from the anhydride is neutralized using another amine, for example 2-ethylhexylamine, to give the ammonium salt. The reverse procedure is equally conceivable: reaction is firstly carried out with ethylhexylamine to give the monoamide, then with ditallow fatty amine to give the ammonium salt. Preferably at least one amine is used here which has at least one straight-chain, unbranched alkyl group having more than 16 carbon atoms. It is not important here whether this amine is present in the build-up of the amide structure or as ammonium salt of the dicarboxylic acid.

Instead of the subsequent reaction of the carboxyl groups or of the dicarboxylic anhydride with amines to give the corresponding amides or amide/ammonium salts, it may sometimes be advantageous to prepare the monoamides or amide/ammonium salts of the monomers and then to copolymerize these directly in the polymerization. Usually, however, this is much more technically complex, since the amines are able to add onto the double bond of the monomeric dicarboxylic acids, and copolymerization is then no longer possible.

Terpolymers based on α,β-unsaturated dicarboxylic anhydrides, α,β-unsaturated compounds and polyoxyalkylene ethers of lower, unsaturated alcohols which comprise 20–80 mol %, preferably 40–60 mol %, of divalent structural units of the formulae 12 and/or 14, and, if desired, 13, where the structural units 13 originate from unreacted anhydride radicals, (12)

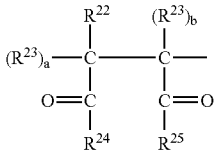

-continued (13)

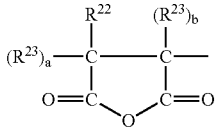

(14)

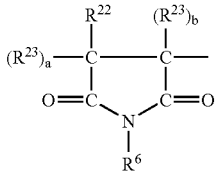

where $R^{22}$ and $R^{23}$, independently of one another, are hydrogen or methyl, a and b are zero or one and a+b is one, $R^{24}$ and $R^{25}$ are identical or different and are —$NHR^6$, $N(R^6)_2$ and/or —$OR^{27}$ groups, and $R^{27}$ is a cation of the formula $H_2N(R^6)_2$ or $H_3NR^6$, 19–80 mol %, preferably 39–60 mol %, of divalent structural units of the formula 15

(15)

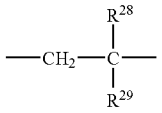

in which $R^{28}$ is hydrogen or $C_1$–$C_4$-alkyl, and $R^{29}$ is $C_6$–$C_{60}$-alkyl or $C_6$–$C_{18}$-aryl, and 1–30 mol %, preferably 1–20 mol %, of divalent structural units of the formula 16

(16)

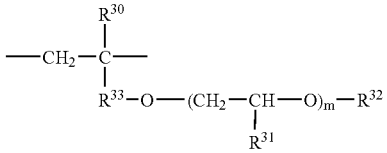

in which $R^{30}$ is hydrogen or methyl, $R^{31}$ is hydrogen or $C_1$–$C_4$-alkyl, $R^{33}$ is $C_1$–$C_4$-alkylene, m is a number from 1 to 100, $R^{32}$ is $C_1$–$C_{24}$-alkyl, $C_5$–$C_{20}$-cycloalkyl, $C_6$–$C_{18}$-aryl or —C(O)—$R^{34}$, where $R^{34}$ is $C_1$–$C_{40}$-alkyl, $C_5$–$C_{10}$-cycloalkyl or $C_6$–$C_{18}$-aryl.

The above-mentioned alkyl, cycloalkyl and aryl radicals may be substituted or unsubstituted. Suitable substituents of the alkyl and aryl radicals are, for example, ($C_1$–$C_6$)-alkyl, halogen, such as fluorine, chloride, bromine and iodine, preferably chloride, and ($C_1$–$C_6$)-alkoxy.

Alkyl here is a straight-chain or branched hydrocarbon radical. Specific mention may be made of the following: n-butyl, tert-butyl, n-hexyl, n-octyl, decyl, dodecyl, tetradecyl, hexadecyl, octadecyl, dodecenyl, tetrapropenyl, tetradecenyl, pentapropenyl, hexadecenyl, octadecenyl and eicosanyl, or mixtures, such as coconut alkyl, tallow fatty alkyl and behenyl.

Cycloalkyl here is a cyclic aliphatic radical having 5–20 carbon atoms. Preferred cycloalkyl radicals are cyclopentyl and cyclohexyl.

Aryl here is a substituted or unsubstituted aromatic ring system having from 6 to 18 carbon atoms.

The terpolymers consist of the divalent structural units of the formulae 12 and 14, and 15 and 16, and, if desired, 13. They additionally only contain, in a manner known per se, the end groups formed in the polymerization by initiation, inhibition and chain termination.

In detail, structural units of the formulae 12 to 14 are derived from α,β-unsaturated dicarboxylic anhydrides of the formulae 17 and 18

(17)

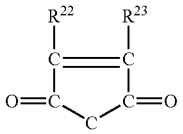

(18)

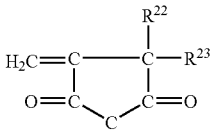

such as maleic anhydride, itaconic anhydride, citraconic anhydride, preferably maleic anhydride.

The structural units of the formulae 15 are derived from α-β-unsaturated compounds of the formula 19.

(19)

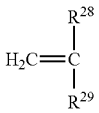

The following α,β-unsaturated olefins may be mentioned by way of example: styrene, α-methylstyrene, dimethylstyrene, α-ethylstyrene, diethylstyrene, i-propylstyrene, tert-butylstyrene, diisobutylene and α-olefins, such as decene, dodecene, tetradecene, pentadecene, hexadecene, octadecene, $C_{20}$-α-olefin, $C_{24}$-α-olefin, $C_{30}$-α-olefin, tripropenyl, tetrapropenyl, pentapropenyl and mixtures thereof. Preference is given to α-olefins having from 10 to 24 carbon atoms and styrene, particularly preferably α-olefins having from 12 to 20 carbon atoms.

The structural units of the formula 16 are derived from polyoxyalkylene ethers of lower, unsaturated alcohols of the formula 20

(20)

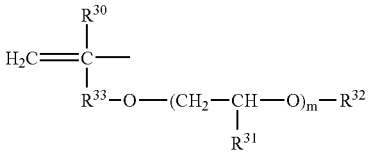

The monomers of the formula 20 are products of the etherification ($R^{32}$+—C(O)$R^{34}$) or esterification ($R^{32}$+—C(O)$R^{34}$) of polyoxyalkylene ethers ($R^{32}$═H).

The polyoxyalkylene ethers ($R^{32}$═H) can be prepared by processes known per se by the addition of α-olefin oxides, such as ethylene oxide, propylene oxide and/or butylene oxide, onto polymerizable, lower, unsaturated alcohols of the formula 21

(21)

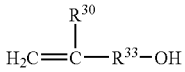

Polymerizable, lower, unsaturated alcohols of this type are, for example, allyl alcohol, methallyl alcohol, butenols, such as 3-buten-1-ol and 1-buten-3-ol, or methylbutenols, such as 2-methyl-3-buten-1-ol, 2-methyl-3-buten-2-ol and 3-methyl-3-buten-1-ol. Preference is given to the products of the addition of ethylene oxide and/or propylene oxide onto allyl alcohol. Subsequent etherification of these polyoxyalkylene ethers to give compounds of the formula 20 in which $R^{32}$+$C_1$–$C_{24}$-alkyl, cycloalkyl or aryl is carried out by processes known per se. Suitable processes are disclosed, for example, in J. March, Advanced Organic Chemistry, 2nd Edition, pp. 357f (1977). These products of the etherification of polyoxyalkylene ethers can also be prepared by adding α-olefin oxides, preferably ethylene oxide, propylene oxide and/or butylene oxide, onto alcohols of the formula 22.

In the monomers of the formula 20, the index m indicates the degree of alkoxylation, i.e. the number of moles of α-olefin which are adducted per mole of the formula 20 or 21.

Examples which may be mentioned of suitable primary amines for the preparation of the terpolymers are the following:

n-hexylamine, n-octylamine, n-tetradecylamine, n-hexadecylamine, n-stearylamine or also N,N-dimethylaminopropylenediamine, cyclohexyl-amine, dehydroabietylamine and mixtures thereof.

Examples which may be mentioned of secondary amines which are suitable for the preparation of the terpolymers are the following: didecylamine, ditetradecylamine, distearylamine, dicoconut fatty amine, ditallow fatty amine and mixtures thereof.

The terpolymers have K values (measured by the Ubbelohde method in 5% strength by weight solution in toluene at 25° C.) of from 8 to 100, preferably from 8 to 50, corresponding to mean molecular weights ($M_w$) of from about 500 to 100,000. Suitable examples are listed in EP 606 055.

Products of the reaction of alkanolamines and/or polyether-amines with polymers containing dicarboxylic anhydride groups, which comprise 20–80 mol %, preferably 40–60 mol %, of divalent structural units of the formulae 25 and 27 and, if desired, 26.

(25)

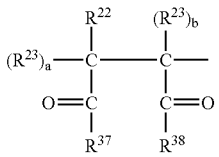

(26)

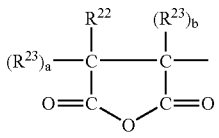

-continued (27)

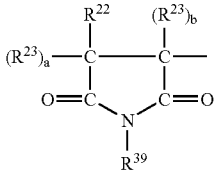

where $R^{22}$ and $R^{23}$, independently of one another, are hydrogen or methyl, a and b are zero or 1, and a+b is 1, $R^{37}$=—OH, —O—[$C_1$–$C_{30}$-alkyl], —$NR^6R^7$, —O'N'$R^6R^7H_2$ $R^{38}$=$R^{37}$ or $NR^6R^{39}$ $R^{39}$=—(A—O)$_x$—E where A=an ethylene or propylene group, x=from 1 to 50, E=H, $C_1$–$C_{30}$-alkyl, $C_5$–$C_{12}$-cycloalkyl or $C_6$–$C_{30}$-aryl, and 80–20 mol %, preferably 60–40 mol %, of divalent structural units of the formula 15.

In detail, the structural units of the formulae 25, 26 and 27 are derived from α,β-unsaturated dicarboxylic anhydrides of the formulae 17 and/or 18.

The structural units of the formula 15 are derived from the α,β-unsaturated olefins of the formula 19. The above-mentioned alkyl, cycloalkyl and aryl radicals have the same meanings as under 8.

The radicals $R^{37}$ and $R^{38}$ in the formula 25 and $R^{39}$ in the formula 27 are derived from polyether-amines or alkanolamines of the formulae 28 a) and b), amines of the formula $NR^6R^7R^8$ and, where appropriate, alcohols having from 1 to 30 carbon atoms.

(28a)

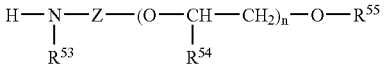

(28b)

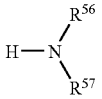

In these formulae, $R^{53}$ is hydrogen, $C_6$–$C_{40}$-alkyl or (28c)

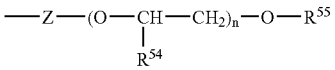

$R^{54}$ is hydrogen or $C_1$–$C_4$-alkyl, $R^{55}$ is hydrogen, $C_1$- to $C_4$-alkyl, $C_5$- to $C_{12}$-cycloalkyl or $C_6$- to $C_{30}$-aryl $R^{56}$ and $R^{57}$, independently of one another, are hydrogen, $C_1$- to $C_{22}$-alkyl, C2- to $C_{22}$-alkenyl or Z—OH, Z is $C_2$- to $C_4$-alkylene, and n is a number from 1 to 1000.

The structural units of the formulae 17 and 18 have preferably been derivatized using mixtures of at least 50% by weight of alkylamines of the formula $HNR^6R^7R^8$ and at most 50% by weight of polyether-amines or alkanolamines of the formulae 28 a) and b).

The polyether-amines employed can be prepared, for example, by reductive amination of polyglycols. Polyether-amines containing a primary amino group are furthermore prepared by addition of polyglycols onto acrylonitrile followed by catalytic hydrogenation. In addition, polyether-amines can be obtained by reaction of polyethers with phosgene or thionyl chloride followed by amination to give the polyether-amine. The polyether-amines employed in accordance with the invention are commercially available (for example) under the name ®Jeffamine (Texaco). Their molecular weight is up to 2000 g/mol, and the ethylene oxide/propylene oxide ratio is from 1:10 to 6:1. Another possibility for the derivatization of the structural units of the formulae 17 and 18 comprises employing an alkanolamine of the formula instead of the polyether-amines and subsequently subjecting the product to oxyalkylation.

From 0.01 to 2 mol, preferably from 0.01 to 1 mol, of alkanolamine are employed per mole of anhydride. The reaction temperature is from 50 to 100° C. (amide formation). In the case of primary amines, the reaction is carried out as temperatures above 100° C. (imide formation).

The oxyalkylation is usually carried out at temperatures of from 70 to 170° C. with catalysis by bases, such as NaOH or $NaOCH_3$, by introducing gaseous alkylene oxides, such as ethylene oxide (EO) and/or propylene oxide (PO). From 1 to 500 mol, preferably from 1 to 100 mol, of alkylene oxide are usually added per mole of hydroxyl groups.

Examples of suitable alkanolamines which may be mentioned are the following: monoethanolamine, diethanolamine, N-methylethanolamine, 3-amino-propanol, isopropanol, diglycolamine, 2-amine-2-methylpropanol and mixtures thereof.

Examples of primary amines which may be mentioned are the following: n-hexylamine, n-octylamine, n-tetradecylamine, n-hexadecylamine, n-stearylamine or also N,N-dimethylaminopropylenediamine, cyclohexylamine, dehydroabietylamine and mixtures thereof.

Examples of secondary amines which may be mentioned are the following: didecylamine, ditetradecylamine, distearylamine, dicoconut fatty amine, ditallow fatty amine and mixtures thereof.

Examples of alcohols which may be mentioned are the following: methanol, ethanol, propanol, isopropanol, n-, sec-, and tert-butanol, octanol, tetradecanol, hexadecanol, octadecanol, tallow fatty alcohol, behenyl alcohol and mixtures thereof. Suitable examples are listed in EP-A-688 796.

Copolymers and terpolymers of N-$C_6$–$C_{24}$-alkylmaleimide with $C_1$–$C_{30}$-vinyl esters, vinyl ethers and/or olefins having from 1 to 30 carbon atoms, such as, for example, styrene or α-olefins. These can be obtained firstly by reaction of a polymer containing anhydride groups with amines of the formula $H_2NR^6$ or by imidation of the dicarboxylic acid followed by copolymerization. The preferred dicarboxylic acid here is maleic acid or maleic anhydride. Preference is given here to copolymers comprising from 10 to 90% by weight of $C_6$–$C_{24}$-α-olefins and from 90 to 10% by weight of N-$C_6$–$C_{22}$-alkylmaleimide.

The mixing ratio between A and B can vary within broad limits. Thus, even small amounts of B of from 100 ppm to 50,000 ppm, preferably from 1000 ppm to 10,000 ppm, in fatty acid solutions act as low-temperature additive for A. They are capable of suppressing the inherent crystallization of the fatty acid, which results in a reduction in the cloud point, and prevent the sedimentation of crystals formed and thus facilitate easy handling at reduced temperatures. For specific problem solutions, however, from 5% to 50%, in particular cases up to 90%, of constituent B, based on the amount of constituent A, may also be present. In particular, the inherent pour point of the additive is lowered and the lubricity of the additive-containing oil is improved. Accordingly, the preferred mixing ratio of A:B is from 1:10 to 1:0.0001, in particular from 1:4 to 1:0.0005, especially from 1:1 to 1:0.001.

The additives according to the invention are added to oils in amounts of from 0.001 to 0.5% by weight, preferably from 0.001 to 0.1% by weight. They can be employed as such or also dissolved in solvents, such as, for example, aliphatic and/or aromatic hydrocarbons or hydrocarbon mixtures, such as, for example, toluene, xylene, ethylbenzene, decane, pentadecane, gasoline fractions, kerosine or commercial solvent mixtures, such as solvent naphtha, ®Shellsol AB, ®Solvesso 150, ®Solvesso 200, ®Exxsol, ®Isopar and ®Shellsol D grades. The additives according to the invention preferably comprise 1–80%, especially 10–70%, in particular 25–60%, of solvent. The additives, which can also be employed without problems at low temperatures of, for example, −40° C. or lower, improve the lubricity of the additive-containing oils and their low-temperature and corrosion-protection properties.

For the preparation of additive packages for special problem solutions, the additives according to the invention may also be employed together with one or more oil-soluble co-additives which, even on their own, improve the low-temperature flow properties and/or lubricity of crude oils, lubricating oils or fuel oils. Examples of co-additives of this type are vinyl acetate-containing copolymers or terpolymers of ethylene, comb polymers, alkylphenol-aldehyde resins and oil-soluble amphiphiles.

Thus, mixtures of the additives according to the invention with copolymers which comprise from 10 to 40% by weight of vinyl acetate and from 60 to 90% by weight of ethylene have proven highly successful. According to a further embodiment of the invention, the additives according to the invention are employed as a mixture with ethylene-vinyl acetate-vinyl neononanoate terpolymers or ethylene-vinyl acetate-vinyl neodecanoate terpolymers for improving the flow properties of mineral oils or mineral oil distillates. Besides ethylene, the terpolymers of vinyl neononanoate or of vinyl neodecanoate comprise from 10 to 35% by weight of vinyl acetate and from 1 to 25% by weight of the respective neo compound. Besides ethylene and from 10 to 35% by weight of vinyl esters, further preferred copolymers also comprise from 0.5 to 20% by weight of olefin, such as diisobutylene, 4-methylpentene or norbornene. The mixing ratio of the additives according to the invention with the ethylene-vinyl acetate copolymers described above or the terpolymers of ethylene, vinyl acetate and the vinyl esters of neononanoic or of neodecanoic acid is (in parts by weight) from 20:1 to 1:20, preferably from 10:1 to 1:10.

The additives according to the invention can thus be employed together with alkylphenol formaldehyde resins. In a preferred embodiment of the invention, these alkylphenol-formaldehyde resins are those of the formula

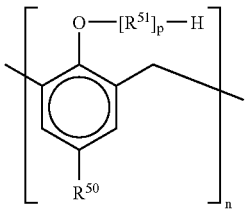

in which $R^{50}$ is $C_4$–$C_{50}$-alkyl or -alkenyl, $R^{51}$ is ethoxy and/or propoxy, n is a number from 5 to 100, and p is a number from 0 to 50.

Finally, in a further embodiment of the invention, the additives according to the invention are used together with comb polymers. These are taken to mean polymers in which hydrocarbons radicals having at least 8, in particular at least 10, carbon atoms are bonded to a polymer backbone. These are preferably homopolymers whose alkyl side chains contain at least 8 and in particular at least 10 carbon atoms. In the case of copolymers, at least 20%, preferably at least 30%, of the monomers have side chains (cf. Comb-like Polymers-Structure and Properties; N.A. Plate and V.P. Shibaev, J. Polym. Sci. Macromolecular Revs. 1974, 8, 117 ff). Examples of suitable comb polymers are, for example, fumarate-vinyl acetate copolymers (of. EP 0 153 176 A1), copolymers of a $C_6$–$C_{24}$-α-olefin and and and N—$C_8$–$C_{22}$-alkylmaleimide (cf. EP 0 320 766), furthermore esterified olefin/maleic anhydride copolymers, polymers and copolymers of α-olefins and esterified copolymers of styrene and maleic anhydride.

Comb polymers can be described, for example, by the formula

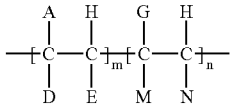

in which

A is R', COOR', OCOR', R"—COOR' or OR';

D is H, $CH_3$, A or R;

E is H or A;

G is H, R", R"—COOR', an aryl radical or a heterocyclic radical;

M is H, COOR", OCOR", OR" or COOH;

N is H, R", COOR", OCOR, COOH or an aryl radical;

R' is a hydrocarbon chain having 8–150 carbon atoms;

R" is a hydrocarbon chain having from 1 to 10 carbon atoms;

m is a number from 0.4 to 1.0; and n is a number from 0 to 0.6.

The mixing ratio (in parts by weight) of the additives according to the invention with resins or comb polymers is in each case from 1:10 to 20:1, preferably from 1:1 to 10:1.

The additives according to the invention are suitable for improving the lubrication properties of animal, vegetable, mineral or synthetic fuel oils in only small added amounts. Their improved low-temperature properties make warming and/or dilution during storage and use unnecessary. In addition, they simultaneously improve the low-temperature and corrosion-protection properties of the additive-containing oils. At the same time, the emulsification properties of the additive-containing oils are impaired less than is the case with the lubrication additives from the prior art. The additives according to the invention are particularly suitable for use in middle distillates. The term middle distillates is taken to mean, in particular, mineral oils which are obtained by distillation of crude oil and boil in the range from 120 to 450° C., for example kerosine, jet fuel, diesel and heating oil. The oils may also comprise or consist of alcohols, such as methanol and/or ethanol. The additives according to the invention are preferably used in middle distillates which contain 0.05% by weight or less of sulfur, particularly preferably less than 350 ppm of sulfur, in particular less than 200 ppm of sulfur and in special cases less than 50 ppm of sulfur. In general, these are middle distillates which have been subjected to reductive refining and which therefore only contain small proportions of polyaromatic and polar compounds which give them a natural lubricity. The additives according to the invention are furthermore preferably used in middle distillates which have 95% distillation points below 370° C., in particular 350° C. and in special cases below 330° C. They can also be employed as components in lubricating oils.

The mixtures can be used alone or also together with other additives, for example with other pour point depressants or dewaxing auxiliaries, with corrosion inhibitors, antioxidants, sludge inhibitors, dehazers, conductivity improvers, lubricity additives and additives for lowering the cloud point. They are furthermore successfully employed together with additive packages which comprise, inter alia, known ash-free dispersion additives, detergents, antifoams and corrosion inhibitors.

The improved low-temperature stability and the effectiveness of the additives according to the invention as lubricity additives is explained in greater detail by the following examples.

EXAMPLES

The following substances were employed:

A1) Tall oil fatty acid comprising, as principal constituents, 30% of oleic acid, 60% of linoleic acid and other polyunsaturated fatty acids and 4% of saturated fatty acids. Iodine number 155 g of 1/100 g A2) Oleic acid (technical-grade) comprising, as principal constituents, 69% of oleic acid, 12% of linoleic acid, 5% of hexadecenoic acid and 10% of saturated fatty acids. Iodine number 90 g of 1/100 g.

B1) Product of the reaction of a terpolymer of $C_{14}/_{16}$-α-olefin, maleic anhydride and allylpolyglycol with 2 equivalents of ditallow fatty amine, 50% in solvent naphtha B2) Product of the reaction of a dodecenylspirobislactone with a mixture of primary and secondary tallow fatty amine, 60% in solvent naphtha B3) Nonylphenol-formaldehyde resin, 50% in solvent naphtha B4) Mixture of 2 parts of B1 and 1 part of B2

B5) Amide/ammonium salt based on ethylenediaminetetraacetic acid with 3 equivalents of ditallow fatty amine in accordance with EP 0597278.

B6) Mixture of amide/ammonium salt based on ethylenediaminetetraacetic acid with 4 equivalents of ditallow fatty amine and copolymer comprising equal parts of maleic anhydride and $C_{20}/_{24}$-olefin, imidated with N-tallow fatty propylenediamine in accordance with EP-0 909 307

B7) Amide/ammonium salt made from 1 mol of phthalic anhydride and 2 mol of a mixture of equal parts of ditallow and dicoconut fatty amine B8) Mixture of equal parts of amide/ammonium salt made from 1 mol of phthalic anhydride and 2 mol of ditallow fatty amine and copolymer of di(tetradecyl) fumarate, 50% in solvent naphtha.

In order to assess the low-temperature properties, the pour point of the mixtures according to the invention was measured in accordance with ISO 3016 (Table 1) [and the cloud point was measured in accordance with ISO 3015 (Table 2)]. The additive mixtures according to the invention were then stored for a number of days at various temperatures and subsequently assessed visually (Tables 3 to 5). C denotes comparative examples.

TABLE 1

Pour point of the additives according to the invention

| Example | Composition (parts by weight) A1 | A2 | B1 | B2 | B3 | B4 | Pour point |
|---|---|---|---|---|---|---|---|
| 1 | 80 | | 20 | | | | −9 |
| 2 | 50 | | 50 | | | | −24 |
| 3 | 20 | | 80 | | | | 0 |
| 4 | 80 | | | 20 | | | −9 |
| 5 | 50 | | | 50 | | | −24 |
| 6 | 20 | | | 80 | | | −6 |
| 7 | 80 | | | | 20 | | 0 |
| 8 | 50 | | | | 50 | | −15 |
| 9 | 20 | | | | 80 | | −48 |
| 10 | 80 | | | | | 20 | −9 |
| 11 | 50 | | | | | 50 | −18 |
| 12 | 20 | | | | | 80 | −15 |
| 13 | | 80 | 20 | | | | −27 |
| 14 | | 50 | 50 | | | | −27 |
| 15 | | 20 | 80 | | | | −6 |
| 16 | | 80 | | 20 | | | −27 |
| 17 | | 50 | | 50 | | | −54 |
| 18 | | 20 | | 80 | | | −45 |
| 19 | | 80 | | | 20 | | −21 |
| 20 | | 50 | | | 50 | | −30 |
| 21 | | 20 | | | 80 | | −21 |
| 22 | | 80 | | | | 20 | −21 |
| 23 | | 50 | | | | 50 | −21 |
| 24 | | 20 | | | | 80 | −9 |
| 25* | 99.95 | | 0.05 | | | | −36 |
| 26* | 99.95 | | | | | 0.05 | −36 |
| 27 | 99.95 | | 0.05 | | | | −15 |
| C1 | 100 | | | | | | −9 |
| C2 | | 100 | | | | | 6 |
| C3 | | | 100 | | | | 9 |
| C4 | | | | 100 | | | −12 |
| C5 | | | | | 100 | | 0 |
| C6 | | | | | | 100 | −6 |
| C7* | 100 | | | | | | −36 |

*These examples are obtained with a 50% by weight formulation of the fatty acid in solvent naphtha.

[TABLE 2

Cloud points of the additives according to the invention

| Example | Composition (parts by weight) A1 | A2 | B1 | B2 | B3 | B4 | Cloud point |
|---|---|---|---|---|---|---|---|
| C8* | 100 | | | | | | −27.0 |
| 28* | 99.9995 | | 0.0005 | | | | −33.0 |
| 29* | 99.9995 | | | | | 0.0005 | −30.5 |
| 30* | 99.998 | | 0.002 | | | | −33.5 |
| 31* | 99.998 | | | | | 0.002 | −33.5 |
| 32* | 99.995 | | 0.005 | | | | −31.0 |
| 33* | 99.995 | | | | | 0.005 | −32.2 |
| 34** (B5) | 99.998 | | 0.002 | | | | −29.0 |
| 35** (B6) | 99.998 | | 0.002 | | | | −31.0 |
| 36** (B7) | 99.998 | | 0.002 | | | | −35.5 |
| 37** (B8) | 99.998 | | 0.002 | | | | −37.0 |

*These examples were obtained with a 50% by weight formulation of the fatty acid in solvent naphtha.

**These examples relate to mixtures of A1 with in each case 2000 ppm of B5 to B8 and are obtained with a 50% by weight formulation of the fatty acid in solvent naphtha.]

TABLE 3

Storage stability of the additives (storage for 3 days at −20° C.)

| Example | Composition (parts by weight) A2 | B1 | B2 | B3 | Assessment |
|---|---|---|---|---|---|
| 38 | 50 | 50 | | | viscous |
| 39 | 80 | | 20 | | liquid |
| 40 | 20 | | 80 | | liquid |
| 41 | 50 | | | 50 | liquid |
| 42 | 20 | | | 80 | liquid |

TABLE 3-continued

Storage stability of the additives (storage for 3 days at −20° C.)

| Example | Composition (parts by weight) A2 | B1 | B2 | B3 | Assessment |
|---|---|---|---|---|---|
| C9 | 100 | | | | solid, waxy |
| C10 | | 100 | | | solid |
| C11 | | | 100 | | solid |
| C12 | | | | 100 | viscous |

TABLE 4

Storage stability of the additives according to the invention dissolved in solvents at −20° C., unless stated otherwise

| Example | Constituent A | Constituent B | Amount ppm | After 1 day | After 3 days | After 5 days | After 7 days | Then 1 day at −28° C. |
|---|---|---|---|---|---|---|---|---|
| C13 | A1 (50% in S.N.) | No additive | | clear, sediment (crystalline) | clear, sediment (crystalline) | clear, sediment (crystalline) | clear, sediment (crystalline) | clear, sediment (crystalline) |
| 43 | A1 (50% in S.N.) | B1 | 100 | clear, few crystals on the base | clear, few crystals on the base | clear, few crystals on the base | clear, few crystals on the base | clear, sediment (crystalline) |
| 44 | A1 (50% in S.N.) | " | 500 | clear, no sediment | clear, few crystals on the base | clear, few crystals on the base | clear, few crystals on the base | clear, sediment (crystalline) |
| 45 | A1 (50% in S.N.) | " | 1000 | clear, no sediment | clear, no sediment | clear, no sediment | clear, no sediment | cloudy, no sediment |
| 46 | A1 (50% in S.N.) | " | 5000 | clear, no sediment | clear, no sediment | clear, no sediment | clear, no sediment | clear, no sediment |
| 47 | A1 (50% in S.N.) | " | 10,000 | clear, no sediment | clear, no sediment | clear, no sediment | clear, no sediment | clear, no sediment |
| 48 | A1 (50% in S.N.) | " | 50,000 | cloudy, no sediment | cloudy, no sediment | cloudy, no sediment | cloudy, no sediment | cloudy, no sediment |
| 49 | A1 (50% in S.N.) | B4 | 100 | clear, few crystals on the base | clear, few crystals on the base | clear, few crystals on the base | clear, few crystals on the base | clear, sediment (crystalline) |
| 50 | A1 (50% in S.N.) | " | 500 | clear, no sediment | clear, no sediment | clear, few crystals on the base | clear, few crystals on the base | clear, sediment (crystalline) |
| 51 | A1 (50% in S.N.) | " | 1000 | clear, no sediment | clear, no sediment | clear, no sediment | clear, no sediment | clear, no sediment |
| 52 | A1 (50% in S.N.) | " | 5000 | clear, no sediment | clear, no sediment | clear, no sediment | clear, no sediment | clear, no sediment |
| 53 | A1 (50% in S.N.) | " | 10,000 | clear, no sediment | clear, no sediment | clear, no sediment | clear, no sediment | clear, no sediment |
| 54 | A1 (50% in S.N.) | " | 50,000 | clear, no sediment | clear, no sediment | clear, no sediment | clear, no sediment | slightly cloudy, no sediment |
| 55 | A1 (50% in S.N.) | B3 | 5000 | clear, crystalline suspended crystalline precipitations | clear, crystalline suspended crystalline precipitations | clear, crystalline suspended crystalline precipitations | clear, crystalline suspended crystalline precipitations | cloudy, crystalline suspended crystalline precipitations |

S.N. = solvent naphtha

TABLE 5

Storage stability of the additives according to the invention dissolved in solvents at −20° C., unless stated otherwise

| Example | Constituent A | Constituent B | Amount ppm | After 3 days | After 7 days | Then 1 day at −28° C. |
|---|---|---|---|---|---|---|
| C14 | A1 (50% in MS) | no additive | | clear, sediment (crystalline) | clear, sediment (crystalline) | clear, sediment (crystalline), solid |
| 56 | " | B1 | 1000 | clear, no sediment | clear, no sediment | cloudy, sediment |
| 57 | " | " | 5000 | cloudy, no sediment | cloudy, no sediment | cloudy, no sediment |
| 58 | " | " | 10,000 | cloudy, no sediment | cloudy, no sediment | cloudy, no sediment |
| 59 | " | B4 | 1000 | clear, no sediment | clear, little sediment | slightly cloudy, sediment |
| 60 | " | " | 5000 | clear, no sediment | clear, no sediment | cloudy, no sediment |
| 61 | " | " | 10,000 | clear, slight cloudiness on the base, no sediment | cloudy, no sediment | cloudy, no sediment |
| 62 | " | " | 50,000 | cloudy, no sediment | cloudy, no sediment | cloudy, no sediment |

MS is a mixture of series of aliphatic and cyclic, non-aromatic hydrocarbons. The principal constituents of MS are shown in the following table:

TABLE 6

Constituents of MS

| Constituent | Concentration range (% by weight) |
|---|---|
| Di-2-ethylhexylether | 10-25 |
| 2-Ethylhexyl 2-ethylhexanoate | 10-25 |
| $C_{16}$-Lactones | 4-20 |
| 2-Ethylhexyl butyrate | 3-10 |
| 2-Ethyl-1,3-hexanediol mono-n-butyrate | 5-15 |
| 2-Ethylhexanol | 4-10 |
| $C_4$- to $C_8$-acetates | 2-10 |
| 2-Ethyl-1,3-hexanediol | 2-5 |
| Ethers and esters ≧ $C_{20}$ | 0-20 |

Lubricity in Middle Distillates

The lubricity of the additives was measured on additive-containing oils at 60° C. by means of an HFRR instrument from PCS Instruments. The high frequency reciprocating rig (HFRR) test is described in D. Wei, H. Spikes, Wear, Vol. 111, No.2, p.217, 1986. The results are given as the friction coefficient and wear scar (WS 1.4). A low friction coefficient and a low wear scar indicate good lubricity.

TABLE 7

Characterization of the test oils:
In order to test the lubricity, test oils having the following characteristics were employed:

| | Test Oil 1 | Test Oil 2 |
|---|---|---|
| Boiling range | 170-344° C. | 182-304° C. |
| Density | 0.830 g/cm$^3$ | 0.821 g/cm$^3$ |
| Cloud point | −9° C. | −33° C. |
| Sulfur content | 45 ppm | 6 ppm |

The boiling characteristics are determined in accordance with ASTM D-86 and the cloud point is determined in accordance with ISO 3015.

TABLE 8

Wear scar in Test Oil 1

| Example | Additive | Wear scar | Friction |
|---|---|---|---|
| C15 | none | 555 μm | 0.33 |
| 63 | 100 ppm acc. to Ex. 37 | 385 μm | 0.18 |
| 64 | 100 ppm A1 + 150 ppm B4 | 381 μm | 0.18 |
| C16 | 100 ppm A1 | 421 μm | 0.18 |
| C17 | 150 ppm B4 | 549 μm | 0.34 |

TABLE 9

Wear scar in Test Oil 2

| Example | Additive | Wear scar | Friction |
|---|---|---|---|
| C18 | none | 637 μm | 0.30 |
| 65 | 200 ppm acc. to Ex. 42 | 386 | 0.18 |
| 66 | 200 ppm acc. to Ex. 48 | 395 | 0.18 |
| C19 | 200 ppm acc. to Ex. C13 | 405 | 0.19 |

What is claimed is:

1. A low-temperature-stabilized additive for fuel oils having a sulfur content of up to 0.05 weight percent, comprising fatty acid mixtures comprising A1) from 1 to 99 weight percent of at least one saturated mono- or dicarboxylic acid having from 6 to 50 carbon atoms, A2) from 1 to 99 weight percent of at least one unsaturated mono- or dicarboxylic acid having from 6 to 50 carbon atoms, and

*B*) at least one polar nitrogen-containing compound, *being a product of a secondary fatty amine having from 8 to 36 carbon atoms,* which is effective as paraffin dispersant in middle distillates, in an amount of from 0.01 to 90 weight percent, based on the total weight of A1), A2), and B), wherein a mixture of A1) and A2) has an iodine number of at least 40 g of 1/100 g, *and said at least one polar nitrogen-containing compound B) is a terpolymer comprising:*

*I) 20–80 mol % of a divalent structural unit of formula 12 and a divalent structural unit selected from the group consisting of formula 14, 13, and mixtures thereof,*

(12)

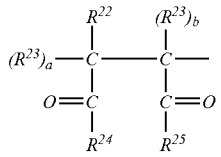

(13)

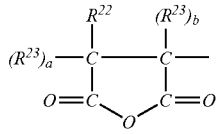

(14)

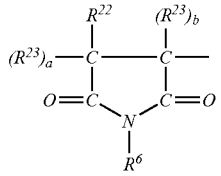

*where*

$R^{22}$ *and* $R^{23}$, *independently of one another, are hydrogen or methyl,*

*a and b are zero or one and a+b is one,*

$R^{24}$ *and* $R^{25}$ *are identical or different and are* —$NHR^6$, $N(R^6)_2$ *or* —$OR^{27}$ *or a combination thereof, and* $R^{27}$ *is a cation of the formula* $H_2N(R^6)_2$ *or* $H_3NR^6$, *and*

$R^6$ *is selected from the group consisting of* $C_8$–$C_{36}$*-alkyl,* $C_6$–$C_{36}$*-cycloalkyl, and* $C_8$–$C_{36}$*-alkenyl,*

*II) 19–80 mol % of a divalent structural unit of formula 15*

(15)

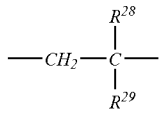

*in which*

$R^{28}$ *is hydrogen or* $C_1$–$C_4$*-alkyl, and*

$R^{29}$ *is* $C_6$–$C_{60}$*-alkyl or* $C_6$–$C_{18}$*-aryl, and*

*III) 1–30 mol % of a divalent structural unit of formula 16*

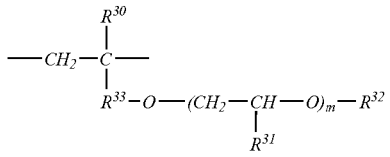

(16)

*in which*

$R^{30}$ *is hydrogen or methyl,*

$R^{31}$ *is hydrogen or* $C_1$–$C_4$*-alkyl,*

$R^{33}$ *is* $C_1$–$C_4$*-alkylene,*

*m is a number from 1 to 100,*

$R^{32}$ *is* $C_1$–$C_{24}$*-alkyl,* $C_5$–$C_{20}$*-cycloalkyl,* $C_8$–$C_{18}$*-aryl or* —C(O)—$R^{34}$*, where* $R^{34}$ *is* $C_1$–$C_{40}$*-alkyl,* $C_5$–$C_{10}$*-cycloalkyl or* $C_6$–$C_{18}$*-aryl.*

*2. The low-temperature-stabilized additive of claim 1 wherein the secondary amine is selected from the group consisting of dicoconut fatty amine, ditallow fatty amine, distearyl fatty amine and mixtures thereof.*

*3. The low-temperature-stabilized additive of claim 1, wherein component B comprises oil-soluble polar amine salts or amides.*

*4. The low-temperature-stabilized additive of claim 1, wherein component A) comprises from 1 to 40% by weight of resin acids.*

*5. The low-temperature-stabilized additive of claim 1, wherein A1) and A2) are each a mono- or dicarboxylic acid having from 12 to 22 carbon atoms.*

* * * * *